(12) United States Patent
Ranjan

(10) Patent No.: US 11,989,169 B2
(45) Date of Patent: May 21, 2024

(54) AUTONOMOUS REFACTORING SYSTEM FOR DATABASE

(71) Applicant: Salesforce, Inc., San Francisco, CA (US)

(72) Inventor: Jyoti Ranjan, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/662,485

(22) Filed: May 9, 2022

(65) Prior Publication Data

US 2023/0359605 A1    Nov. 9, 2023

(51) Int. Cl.
  G06F 16/22    (2019.01)
  G06F 16/31    (2019.01)

(52) U.S. Cl.
  CPC ........ G06F 16/2272 (2019.01); G06F 16/328 (2019.01)

(58) Field of Classification Search
  CPC ............................ G06F 16/2272; G06F 16/328
  See application file for complete search history.

(56) References Cited

U.S. PATENT DOCUMENTS

| | | | | |
|---|---|---|---|---|
| 5,819,251 | A * | 10/1998 | Kremer | G06F 16/284 |
| 9,535,948 | B1 * | 1/2017 | Cuthbert | G06F 16/2452 |
| 10,664,487 | B2 | 5/2020 | Bruce et al. | |
| 11,200,232 | B2 | 12/2021 | Taylor | |
| 2011/0258178 | A1 * | 10/2011 | Eidson | G06F 16/242 |
| | | | | 707/769 |
| 2011/0258225 | A1 * | 10/2011 | Taylor | G06F 16/2272 |
| | | | | 707/769 |
| 2017/0242907 | A1 * | 8/2017 | Goris | G06F 16/334 |
| 2019/0155831 | A1 | 5/2019 | Indeck et al. | |
| 2020/0183897 | A1 * | 6/2020 | Laskawiec | G06F 16/214 |
| 2020/0210447 | A1 | 7/2020 | Kumarasamy et al. | |
| 2021/0011911 | A1 * | 1/2021 | Bruce | G06F 16/284 |
| 2021/0240522 | A1 | 8/2021 | Ranjan et al. | |

* cited by examiner

*Primary Examiner* — Grace Park
(74) *Attorney, Agent, or Firm* — Kowert, Hood, Munyon, Rankin & Goetzel, P.C.; Dean M. Munyon

(57) ABSTRACT

Techniques for refactoring data in a database are disclosed. A database may initially store both relational and non-relational data. A request to access data from a first data element in the database may be received via a relational database API. Upon receiving the request, a determination is made as to whether the first data element has been refactored into relational and non-relational portions. If the first data element has not been refactored, a refactoring operation is carried out by storing relational portions of the first data element into a relational database and the non-relational portions of the first data element into a non-relational database. The refactoring is performed concurrent with providing data to a requesting computing system. Additionally, refactoring information is updated to indicate that the first data element has been refactored.

20 Claims, 8 Drawing Sheets

Config. File 305

Structured (Columns 1 – M)
- Serial Numbers
- Phone Numbers
- Account Numbers
- General Data with Fixed Length Fields
- Variable length data such as names Unstructured (Columns M+1 – N):
- Text Files
- Media Files (e.g., Audio, Video, Images)
- Website Data
- Communications Data (e.g., chat transcripts, call transcripts)
- Sensor Data
- General Data with variable length fields

Fig. 3

AUTONOMOUS REFACTORING SYSTEM FOR DATABASE

BACKGROUND

Technical Field

This disclosure is directed to databases, and more particularly, to mechanisms for organizing data within a database.

Description of the Related Art

Broadly speaking, data can be subdivided into structured data and non-structured data. Structured data, as its name suggests, has some definable structure (e.g., a defined length). Unstructured data, on the other hand, lacks such structure—examples include text files, audio and video files, etc.

Structured data may be stored in a database according to a Relational Database Management System (RDBMS). Using RDBMS, data in a database may be presented to users as various relations. These relations may be presented as a collection of tables having corresponding sets of rows and columns. Within a given table, a row may be identified by a unique key, with each row being referred to as a record. The columns may represent attributes of the various records. Relational operators may be provided to manipulate the data.

For unstructured data, NoSQL (No Structured Query Language) databases have been developed. NoSQL database come in a wide variety of types. For example, one type of NoSQL database uses a key-value store, with data being represented as key-value pairs in which each key is used only once in the database. Graph databases are another type of database that can be used to store unstructured data, with the data represented by a graph structure having a number of nodes and a number of edges. The nodes may be used to represent particular data values, while the edges between nodes can be used to represent a relationship between the nodes.

BRIEF DESCRIPTION OF THE DRAWINGS

The following detailed description makes reference to the accompanying drawings, which are now briefly described.

FIG. 3 is a diagram illustrating an example configuration file for one embodiment of a database that handles both structured and unstructured data.

DETAILED DESCRIPTION OF EMBODIMENTS

Figure 1:
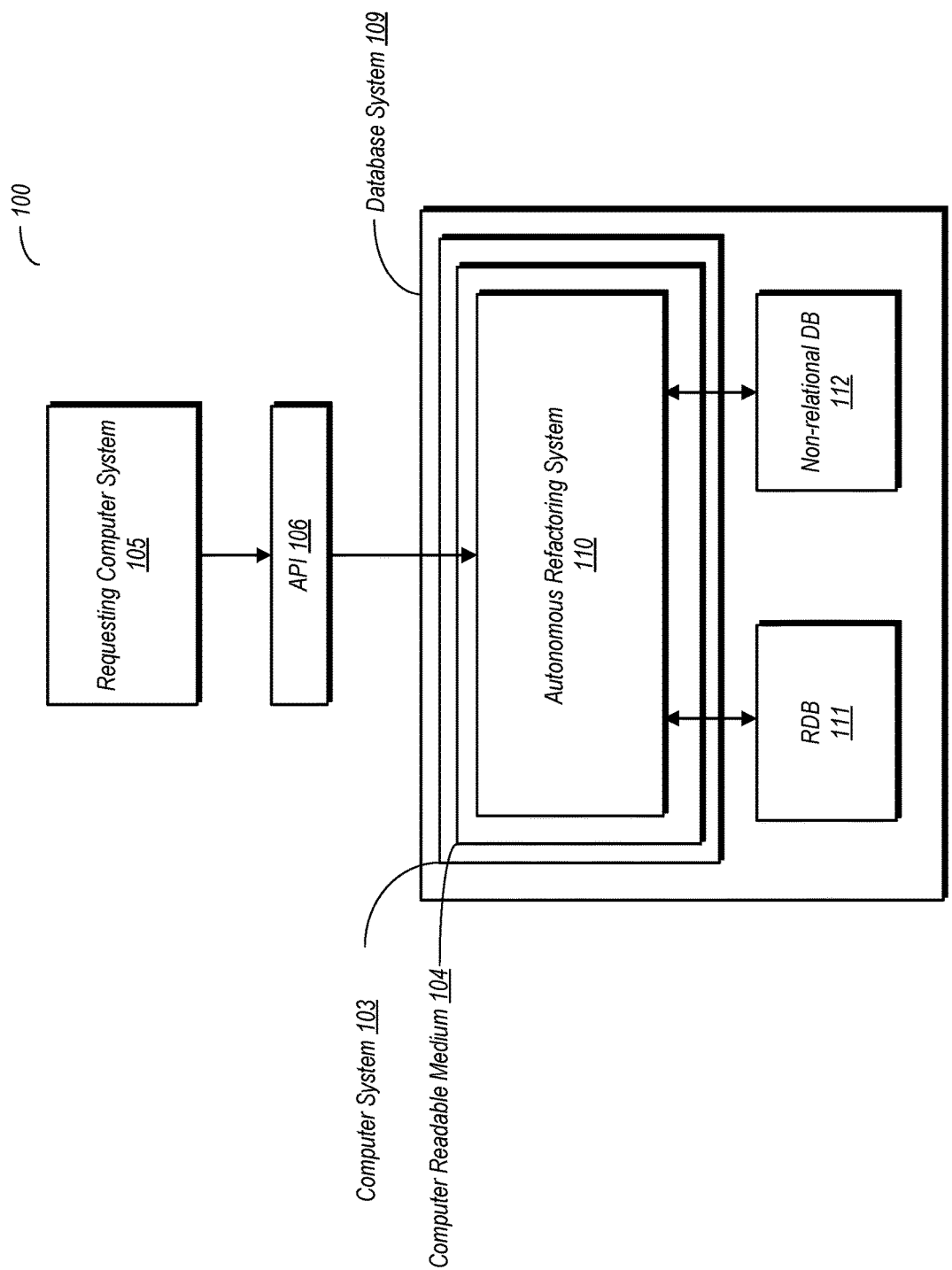
FIG. 1 is a block diagram of one embodiment of an autonomous refactoring system.

The present disclosure is directed to various embodiments of a method for refactoring (i.e., reorganizing) data in a database that stores both structured and unstructured data. Structured data, as is understood in the art, is data that has a well-defined format. It is commonly stored in databases—for example, in length-delineated fields (e.g., account numbers, phone numbers, etc.) or certain types of variable-length fields (e.g., names). While structured data is considered to be less common than unstructured data, the big-data movement is powered by structured data because this type of data is relatively easy to access, and the outcomes of using it are more accurate.

Unstructured data, within the context of the present disclosure, is data that does not conform to a known data model or schema. Examples of unstructured data includes (but is not limited to) text files, emails, media file (e.g., audio, video, images, etc.), website data, communications transcripts, and so on.

When Relational Database Management Systems (RDBMS) were originally developed, they primarily stored structured data. In recent years, however, there has been a rise in the amount of unstructured data from a variety of sources, including the Internet of Things (IoT), social media, and wider Internet access. This has led to unstructured data being stored in RDBMS. While there are certain types of systems that have been designed to support unstructured data (e.g., NoSQL databases), a significant amount of unstructured data is still stored in relational database systems.

The problem of storing increased amounts of structured data in RDBMS systems has been addressed in part by support for LARGE data column types in RDBMS (CLOB, BLOB, and BFILE being examples of this format). The inventor, however, has recognized that this is only a temporary fix, as RDBMS systems are increasingly being asked to handle more and more unstructured data. While there are systems specifically designed to store unstructured data, this does not address the problem of entities that currently utilize an RDBMS framework (e.g., a legacy framework that is being asked to store increasing amounts of unstructured data).

To address this problem, the inventor has proposed an autonomous refactoring system (ARS) that is able to transform a relational database with both structured and unstructured data into separate data stores: a target relational database (which can be the same or different from the source relational database), and a non-relational database. The proposed ARS maintains the current user interface so as to not break existing client applications (i.e., it uses the API of the source relational database).

When a data request to the source relational database is received, the ARS, in addition to retrieving the relevant data, determines whether a data element, or chunk, that includes the requested data has been refactored (that is, separated into different data stores). This determination may be made by referring to a data structure such as a refactor index. For data that has not been refactored, a refactor engine migrates the unstructured data in the chunk to the non-relational database). The structured data can either remain in the source relational database or be moved to a target relational database. Meanwhile, the refactor index may be updated to indicate that the data has been refactored. The refactoring operation can be performed in the background with the fetching of the requested data (and may thus also be performed concurrently therewith). Over time, as all data is accessed, the refactoring is completed.

As noted, by using the disclosed techniques, data can be refactored and unstructured data can be migrated without having to change the API of the source relational database. Since the refactoring can be conducted in the background, this allows the database to continue servicing queries as the refactoring progresses, instead of performing the refactoring in a manner that prevents continued use of the database. Furthermore, using the disclosed techniques, the increase in the size of the structured database in a post-refactoring environment is predictable, as there is a predictable and controlled increase in the amount of structured data stored therein.

Turning now to FIG. 1, a block diagram of one embodiment of a computer system 100 is shown. As shown, computer system 100 includes requesting (or client) computer system 105 and database system 109, which is accessed via application programming interface (API) 106. Database system 109 includes relational database 111 and non-relational database 112. Database system 109 also includes a computer system 103 that can be used to implement autonomous refactoring system 110 via program instructions stored on computer-readable medium 104.

Requesting computer system 105 is representative of any client computer system that makes data requests to database system 109. Initially, storage within computer system 100 is located within relational database 111. Database 111 stores both structured data and unstructured data. As is typical with RDBMS, the structured data can be stored in fields of known formats, such as length-delineated and variable-length fields. Although databases such as relational database 111 are specifically designed for storing structured data, in some instances these databases can also be used to store unstructured data. This may occur for various reasons, not the least of which is the sheer prevalence of unstructured data. Further, an organization may not initially have had a database specifically dedicated to unstructured data. Accordingly, database system 109 is accessed via API 106, which is a relational database API.

Autonomous refactoring system 110 constitutes software that allows the gradual refactoring (or segregation) of data from a first, or source relational database (here, relational database system 111) into a second, or target relational database on one hand and a non-relational database on the other hand. (In some embodiments, the source and target relational databases may be the same or different.) After refactoring is complete, structured data will exist in relational database 111 and unstructured data will exist in non-relational database 112.

Accordingly, non-relational database 112 can be added to computer system 100 in order to store unstructured data separately from relational database 111 after the refactoring. Non-relational databases (which may also be referred to as NoSQL databases) may be implemented in a number of different ways, including document, key-value, wide-column, and graph databases, among others. Examples of unstructured data that may be stored in non-relational database 112 include email, various media files (digital photos, audio files, video files), text files, documents, data from websites and social media services, etc.

Autonomous refactoring system 110 in the embodiment shown thus acts to refactor data currently stored in relational database 111 into relational database 111 (or a different relational database) and non-relational database 112. When data is accessed from database system 109 in response to a request from system 105, a block (or chunk or element) of data may be accessed that includes data beyond which is explicitly requested. The data element may thus include the requested data, as well as additional data. Upon retrieving data, autonomous refactoring system 110 can determine whether the data within the data element being accessed has been refactored into relational (structured) and non-relational (unstructured) portions. If not, the requested data is retrieved from relational database 111 and provided to the requesting computer system 105. Furthermore, in the background, autonomous refactoring system 110, executing on database computer system 103, separates the unstructured and structured data in the retrieved data element and stores the portion that is unstructured in unstructured database 112. (System 110 can also move the structured data if the target relational database differs from the source relational database.) Autonomous refactoring system 110 can also include, within relational database 111, a reference to a location of the unstructured data that has been stored in unstructured database 112 as a result of the refactoring. In this manner, any original linkage between the structured and unstructured data can be maintained. Additionally, autonomous refactoring system 110 can also store refactoring information (e.g., in a refactoring index) indicating that the data within the retrieved data element has been refactored. This type of data structure allows system 110 to determine, for a subsequent request, whether a data element has already been refactored. If refactoring has already been performed, then the requested data is retrieved from relational database 111 and non-relational database 112 as needed.

Figure 2:
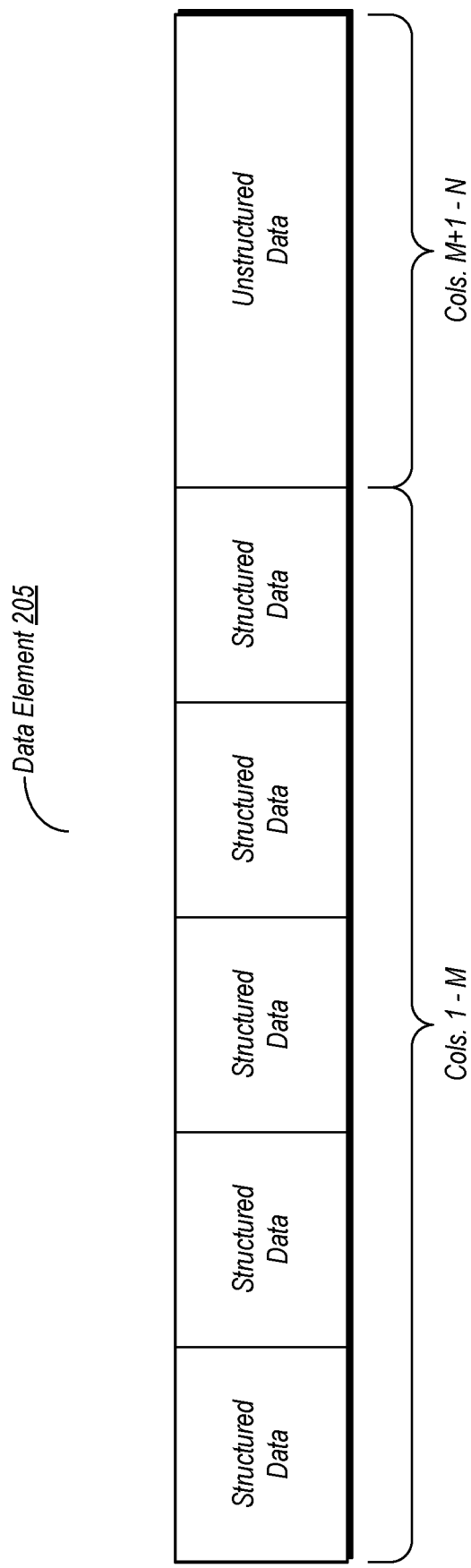
FIG. 2 is a diagram illustrating a data element prior to refactoring in one embodiment of a database.

FIG. 2 is a diagram illustrating a data element prior to refactoring in one embodiment of a relational database. In the embodiment shown, data element 205 includes a number of fields of structured data and additionally includes some fields of unstructured data. More particularly, data element 205 is one example of how structured (relational) and unstructured (non-relational) data may be co-mingled in some relational databases. The structured data may be in fields that are of fixed length, although structured data in fields of variable length are also possible. Data element 205 may be located in any one or more of a variety of data objects (e.g., tables) within database system 109.

In data element 205 (and more generally, a structured/relational database in which unstructured/non-relational data is stored), particular columns therein may be designated to store the unstructured data. In this particular example, there are N columns, with columns 1 to M designated for structured data, and with columns M+1 to N designated for unstructured data. It is noted that different sets of columns within the structured data portion may store different types of data. For example, a first set of columns may store integer data, a second set of columns may store character data, while a third set of columns may store timestamp data, etc. The columns designated for unstructured data may be used as necessary for the given pieces of data stored therein. In various embodiments, the unstructured data may be stored as BLOB (binary large object) data.

In some cases, it may not be easily ascertainable to autonomous refactoring system 110 which portions of database system 109 constitute structured versus unstructured data. Accordingly, a configuration file may be used to make this determination in some embodiments. FIG. 3 is a diagram illustrating an example configuration file for one embodiment of a database that handles both structured and unstructured data. In this particular embodiment, a configuration file designates certain types of data as structured data that can be stored in a relational database in designated columns (e.g., in columns 1 to M of the example shown in FIG. 2). The structured data may include (but is not limited to) serial numbers, phone numbers, account numbers, general data with fixed length fields, and certain types of variable length data such as names. Configuration file 305 may thus be used during refactoring when a particular data element needs to be written to the target relational database and the non-relational database, as it indicates what portions of the data element go to which databases. Configuration file 305 can also be used by a relational database system that stores both structured and unstructured data, prior to implementation of the autonomous refactoring system 110, in order to determine where newly input data is to be stored and where it can be found.

Figure 4:
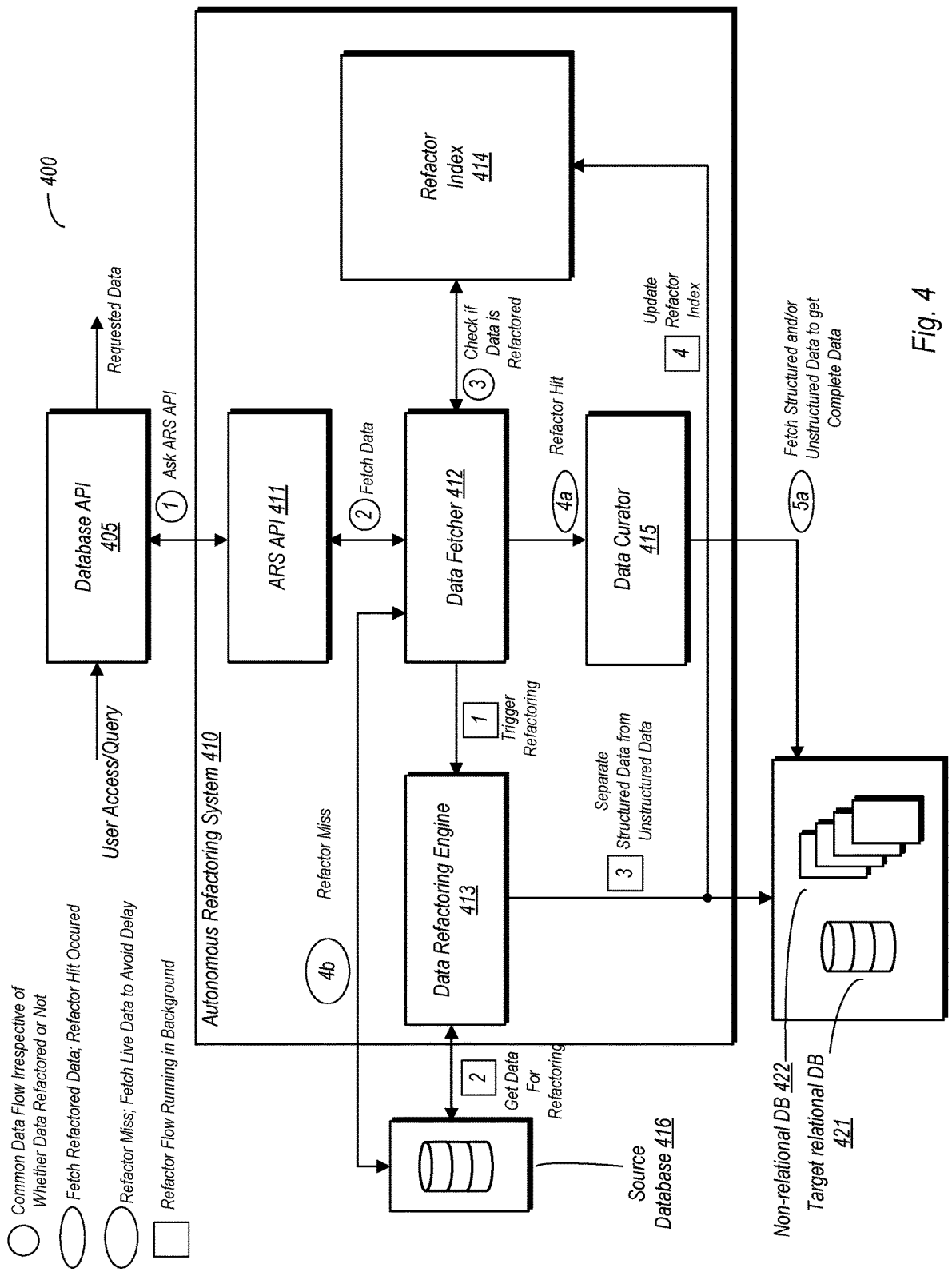
FIG. 4 is a block diagram illustrating operation of an embodiment of an autonomous refactoring system during a refactoring operation.

FIG. 4 is a block diagram illustrating operation of one embodiment of an autonomous refactoring system. In the embodiment shown, database system 400 includes a database API 405 that, as described above, is the existing API for source database 41. ARS 401 includes an autonomous refactoring system (ARS) API 411, a data fetcher 412, a data refactoring engine 413, a refactor index 414, and a data curator 415. The data may initially be stored in a source database 416, which can store both structured and unstructured data. Refactored data is to be stored into two different databases: target relational database 421 and an non-relational database 422. It is noted that in some embodiments, the source database 416 and the target relational database 421 may be the same database. In other embodiments, databases 416 and 421 can be different databases (target database 421 may be significantly smaller than source database 416 once unstructured data is moved to a different database, for example).

The refactoring process is now described in more detail. In response to receiving a request for access from a user, database API 405 sends a request to ARS API 411, which is the interface for the ARS 410. ARS API 411, in turn, sends a command to data fetcher 412 to fetch the requested data. Data fetcher 412 performs a lookup in refactor index 414 to determine if the data element that includes the requested data has previously been refactored.

Refactor index 414 is a record of which database entries or elements have been refactored. In some embodiments, refactor index 414 is accessed using a portion of the address of the requested data element. In the context of the present disclosure, a determination that a data element has been refactored is referred to as a refactoring hit, while a determination that a data element has not yet been refactored is referred to as a refactor miss. In the illustrated embodiment, a refactor miss causes "live" data to be fetched from source database 416 and returned via database API 405 in order to satisfy the user query.

Meanwhile, a refactor miss causes data fetcher 412 to trigger data refactoring engine 413 to retrieve data for refactoring from source database 416. Engine 413 separates structured and unstructured data (e.g., according to a configuration file). Structured data is written to target relational database 421 (which can be the same as source database 416), while unstructured data is written to non-relational database 422. Engine 413 then updates refactor index 414 to indicate that the data element has now been refactored. Subsequent requests for the data element will thus result in a refactor hit.

On the other hand, a refactor hit results in data being fetched from one or both of target relational database 421 and non-relational database 422. In the illustrated embodiment, data fetcher 412 signals data curator 415, which can access databases 421 and 422 and curate (organize) the retrieved data in order to provide it to the requesting computer.

Figure 5A:
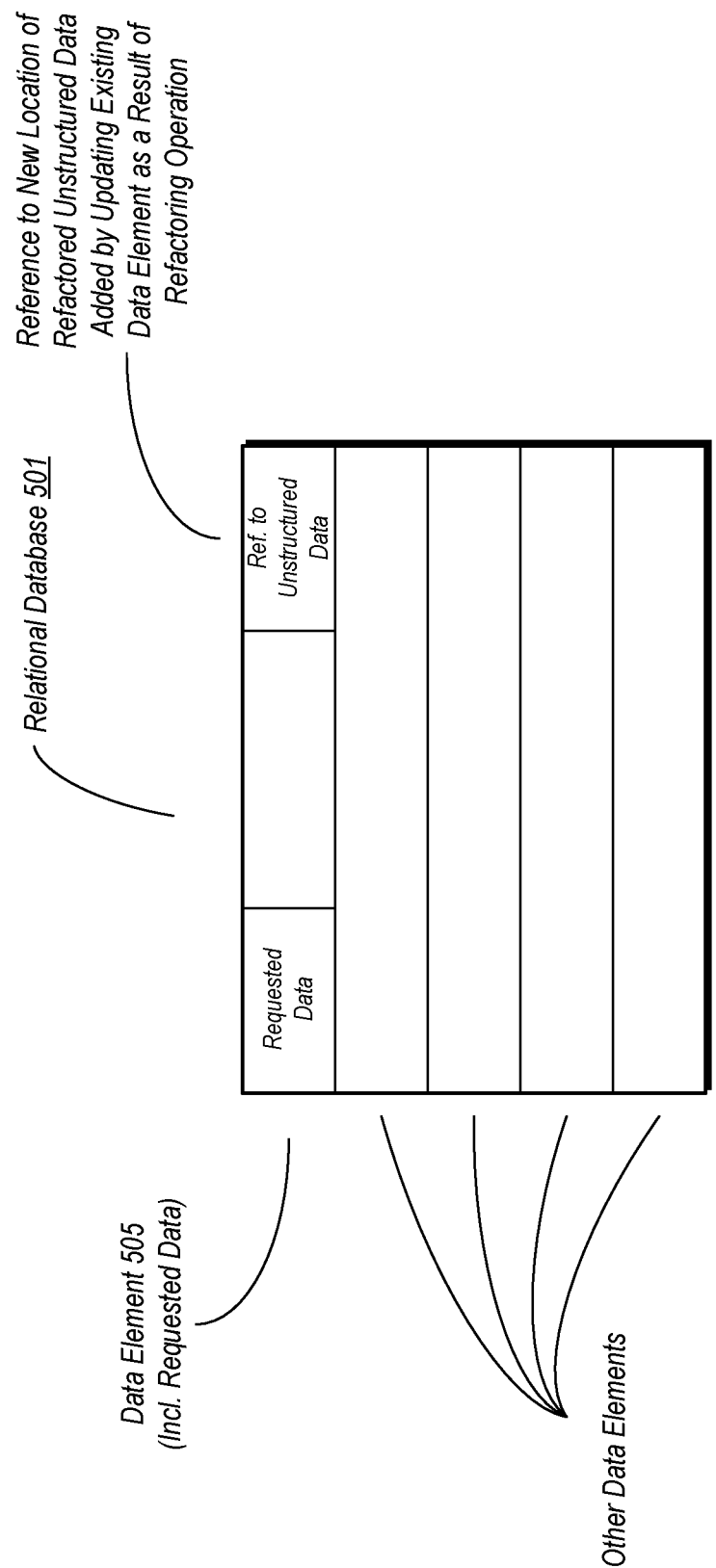
FIG. 5A is diagram illustrating data elements in one embodiment of a relational database after refactoring.

FIG. 5A is diagram illustrating data elements in one embodiment of a relational database after refactoring. More particularly, FIG. 5A illustrates one arrangement of a data element after refactoring has been performed on that element. Data element 505 in the example shown includes the requested data (which, in this case, fell into the structured portion of the element). Data element 505 also includes a reference indicating the location of unstructured data that was formerly a part of data element 505 and that now resides in the non-relational database. In this embodiment of database 501, the source database and the target structured database are the same database. Accordingly, structured data in data element 505 remains in the same location both pre- and post-refactoring, while the unstructured data is moved to the. Upon a subsequent request for the unstructured data moved by refactoring, the reference may indicate to, e.g., a data fetch engine, where the unstructured data can now be found. Thereafter, the unstructured data can be accessed from the non-relational database. The use of the reference to the location of the unstructured data in various embodiments allows the continued use of the API that was utilized when all data (both structured and unstructured) was stored in a single database that conformed to a relational database management system.

Figure 5B:
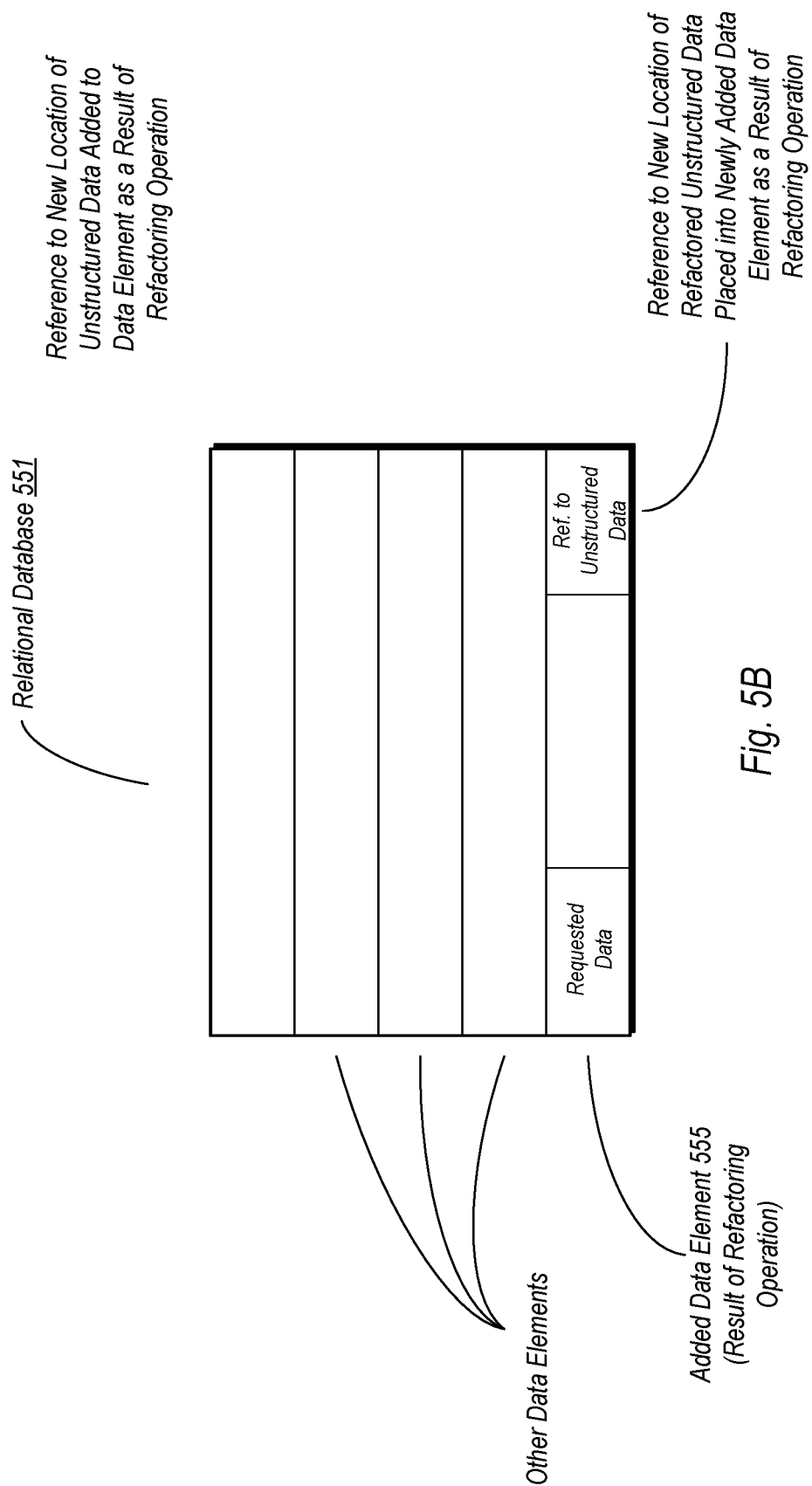
FIG. 5B is a diagram illustrating data elements in another embodiment of a relational database after refactoring.

FIG. 5B is a diagram illustrating data elements in another embodiment of a relational database after refactoring. In this example, database 551 is a target relational database that is different from the source relational database. Thus, instead of updating a data element of the source database during the refactoring process, the illustrated embodiment depicts that a new database element is instead added to a new (target) relational database. The new element may include any structured data that was present in the data element from the source relational database. The unstructured data present in the data element accessed from the source relational database is then placed in a non-relational database, and data element 555 is updated with a reference to its new location.

Figure 6:
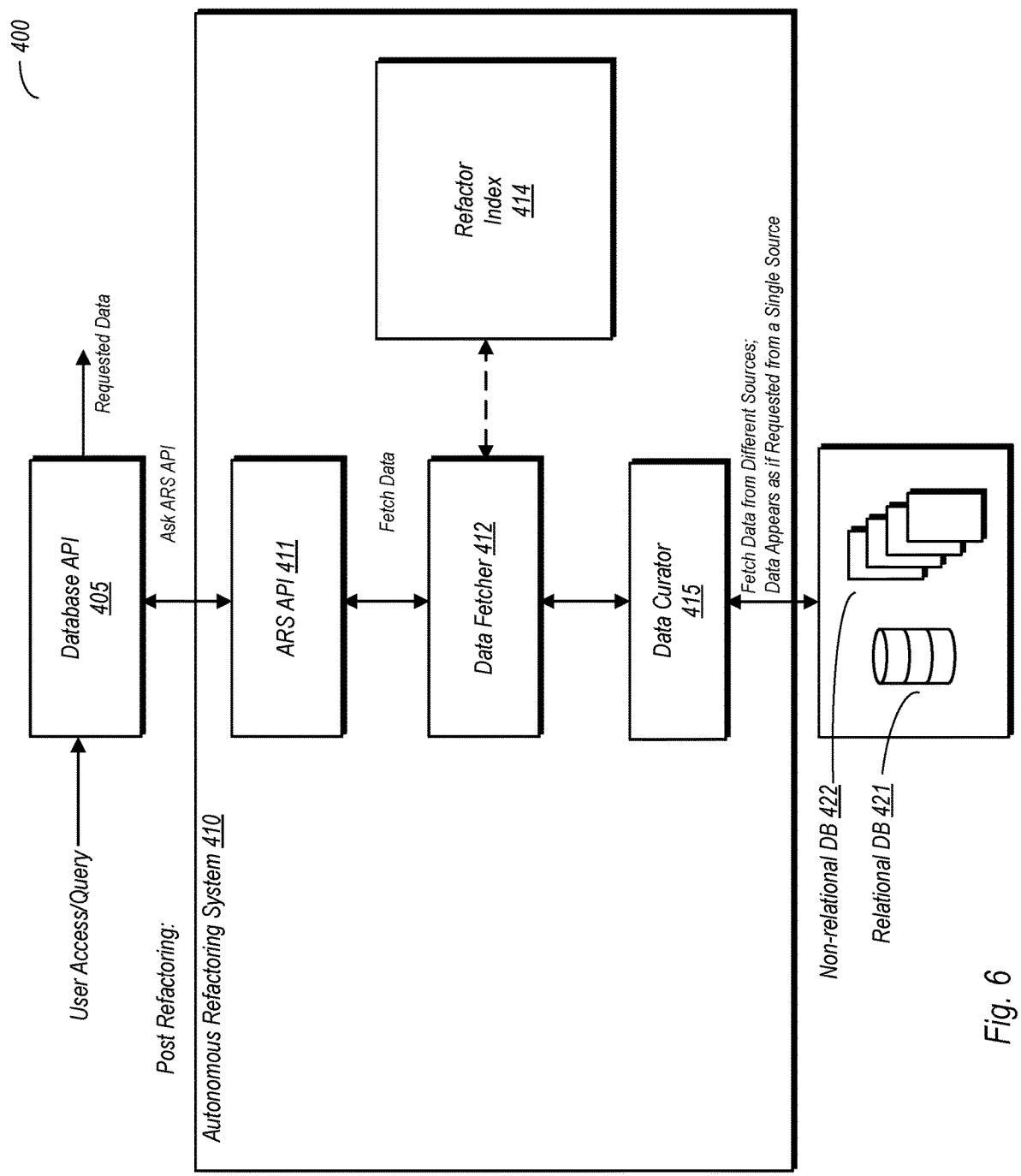
FIG. 6 is a diagram illustrating operation of an embodiment of a database system after refactoring of relational and non-relational data has been performed.

FIG. 6 is a diagram illustrating operation of an embodiment of a database system after refactoring of structured and unstructured data has been performed. In other words, FIG. 6 illustrates the operation of database system 400 (previously discussed in reference to FIG. 4) after all data has been refactored into relational database 421 and non-relational database 422.

Upon receiving a request for data, database API 405 submits a corresponding request to ARS API 410. In response thereto, ARS API 410 issues a command to data fetcher 411 to fetch the data. In the embodiment shown, data fetcher 412 accesses refactor index 414, which may provide an indication that all data has been refactored. Thereafter, the data fetcher 412 may command data curator 415 to obtain the requested data, which is then returned and eventually provided to the requesting computer system.

As noted above, the refactoring system disclosed herein is arranged to allow for refactoring of data while maintaining the API that was originally designed for the source database, which is a structured database. The system disclosed herein further allows the same API to be used after refactoring is complete, making it appear to the requesting computer system that the data is obtained from a single source, even though there are separate structured and unstructured databases present. Thus, while the API (as well as a user interface) may appear to be configured solely for a structured database, it may nevertheless allow accessing unstructured data from target relational database 421 without any changes from its pre-refactoring state.

Figure 7:
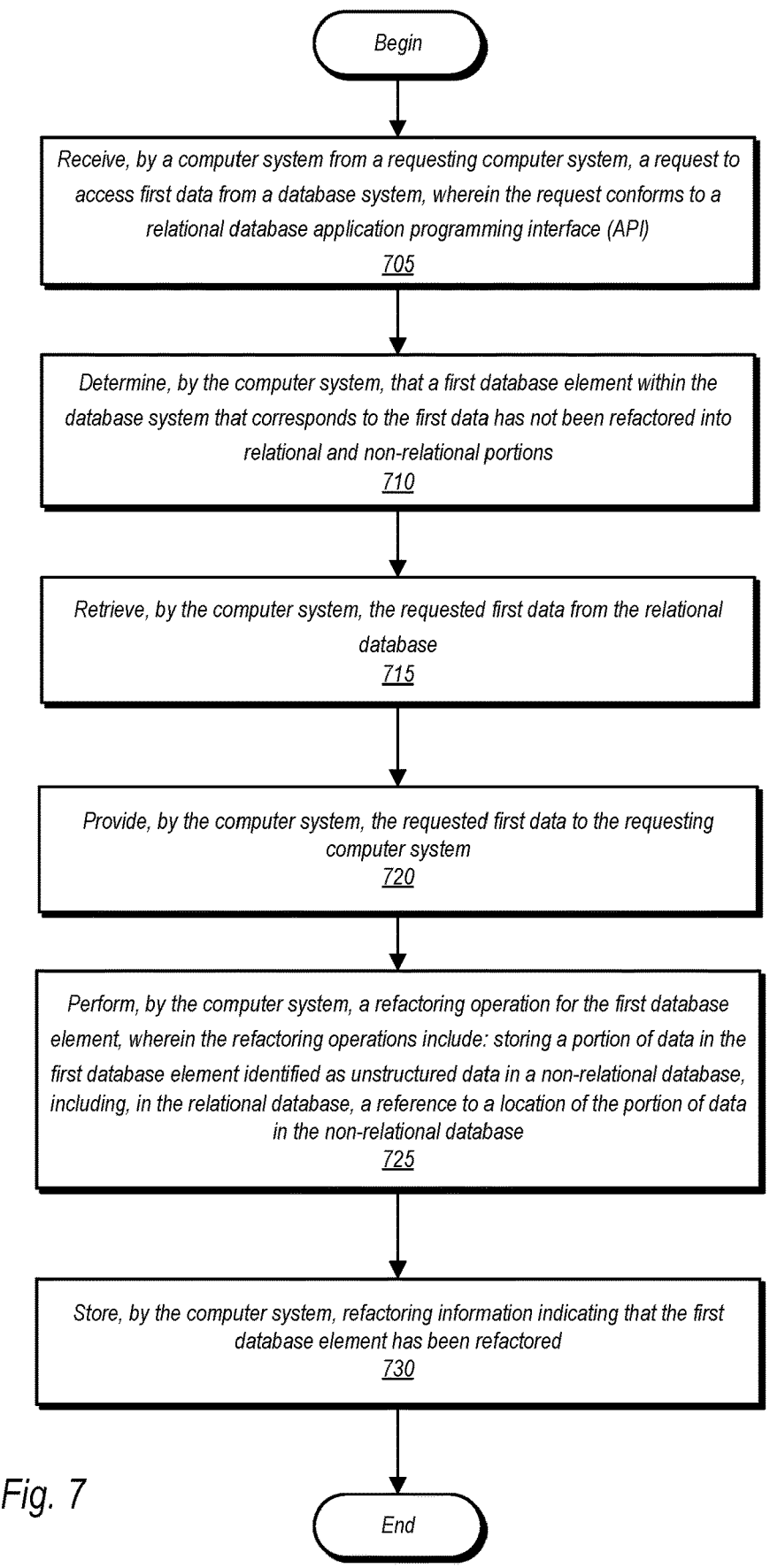
FIG. 7 is a flow diagram illustrating one embodiment of a method for refactoring relational and non-relational data initially stored in a common database.

FIG. 7 is a flow diagram illustrating one embodiment of a method for refactoring relational and non-relational data initially stored in a common, relational database. Method 700 may be carried out by various embodiments of a database system discussed above that includes a database computer system that includes an autonomous refactoring system. Database systems not explicitly discussed herein but nevertheless capable of carrying out Method 700 are considered to also fall within the scope of this disclosure.

Method 700 includes receiving, by a computer system from a requesting computer system, a request to access first data from a database system (such as database system 400 discussed above), wherein the request conforms to a relational database application programming interface (API) (block 705). The method further includes determining, by the computer system, that a first database element within the database system that corresponds to the first data has not been refactored into relational and non-relational portions (block 710) and retrieving, by the computer system, the requested first data from the relational database (block 715). These functions may be carried out by an autonomous refactoring system as discussed above. In response to the request, the method continues by providing, by the computer system, the requested first data to the requesting computer system (block 720). In the background, or concurrent therewith, the method further includes performing, by the computer system, a refactoring operation for the first database element, wherein the refactoring operations include storing a portion of data in the first database element identified as unstructured data in a non-relational database and including, in the relational database, a reference to a location of the portion of data in the non-relational database (block 725). After the refactoring, the method continues with storing, by the computer system, refactoring information indicating that the first database element has been refactored (block 730).

In some embodiments, the reference to the location of the portion of data in the non-relational database is included by updating the first database element. Embodiments are also possible and contemplated in which wherein the reference to the location of the portion of data in the non-relational database is included by updating a new database element.

In one embodiment, the method includes determining, by the computer system, that a first set of additional data elements within the relational database corresponding to the first data have not been refactored into relational and non-relational portions. The method also includes determining, by the computer system, that a second set of additional data elements within the relational database corresponding to the first data have been refactored into relational and non-relational portions and, in response to the request, performing refactoring operations for the first set of additional data elements, but not the second set of additional data elements.

The refactoring operation occurs, in various embodiments, as a background response that has lower priority than handling live data requests. In some embodiments, the refactoring operation overlaps with the providing the requested first data to the requesting computer system. Various embodiments of the method also include accessing a configuration file to determine which portions of data stored in the database system comprise unstructured data.

Embodiments are further possible and contemplated wherein the relational database is a source relational database, wherein the requested first data is retrieved from the source relational database, and wherein the refactoring operations further include storing relational portions of data in the first database element to a target relational database that is different from the source relational database. Such embodiments of the method may further include receiving, by the computer system from the requesting computer system, a second request to access second data from the database system and determining, by the computer system, that a second database element within the database system has been refactored into relational and non-relational portions. In response to the determining, the method continues with retrieving by the computer system, a first portion of the second data from the target relational database and a second portion of the second data from the non-relational database, combining, by the computer system, the retrieved first and second portions of the second data, and providing, by the computer system, the combined first and second portions to the requesting computer system.

After completing refactoring of data in the database system into a target relational database and the non-relational database, various embodiments of the method include receiving, by the computer system, a subsequent request to access the first data from the database system. Such embodiments also include accessing, by the computer system in response to the subsequent request, a refactor index to determine locations of the first data in the target relational database system and the non-relational database and retrieving by the computer system using the determined locations, a first portion of the first data from the target relational database and a second portion of the first data from the non-relational database. Thereafter, the method continues by combining, by the computer system, the retrieved first and second portions of the first data and providing, by the computer system, the combined first and second portions to the requesting computer system.

The various techniques described herein may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, a system that implements the methods described with respect to any of the disclosed techniques is also contemplated.

The present disclosure refers to various software operations that are performed in the context of a database computer system such as that shown in FIG. 1. In general, any of the services or functionalities described in this disclosure can be performed by a host computer system that is capable of connecting to one or more databases. A host computer system can be configured according to any known configuration of computer hardware. A typical hardware configuration includes a processor subsystem, memory, and one or more I/O devices coupled via an interconnect. A given host computer system may also be implemented as two or more computer systems operating together.

The processor subsystem of the host computer system may include one or more processors or processing units. In some embodiments of the host computer system, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computer system is usable to store program instructions executable by the processor subsystem to cause the host computer system to perform various operations described herein. The system memory may be implemented using different physical, non-transitory memory media, such as hard disk storage, floppy disk storage, removable disk storage, flash memory, random access memory (RAM SRAM, EDO RAM, SDRAM, DDR SDRAM, RAMBUS RAM, etc.), read-only memory (PROM, EEPROM, etc.), and so on. Memory in the host computer system is not limited to primary storage. Rather, the host computer system may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computer system may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices).

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," other components, etc.) may be described or claimed as "configured" to perform one or more tasks or operations. This formulation [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, a system having a processor unit and a memory storing program instructions executable to implement the task, etc. This phrase is not used herein to refer to something intangible.

In some cases, various units/components may be described herein as performing a set of tasks or operations. It is understood that those entities are "configured to" perform those tasks/operations, even if not specifically noted.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Numerous variations and modifications will become apparent to those skilled in the art once the above disclosure is fully appreciated. It is intended that the following claims be interpreted to embrace all such variations and modifications.

What is claimed is:

1. A method for performing a refactoring process on a database system, comprising:
receiving, by a computer system from a requesting computer system, a request to access first data from the database system, wherein the request conforms to a relational database application programming interface (API), wherein the database system includes a relational database storing structured data and unstructured data that is being refactored according to the refactoring process such that the unstructured data is stored in a non-relational database;
determining, by the computer system, that a first database element within the relational database that includes the first data has not yet been refactored;
retrieving, by the computer system, the requested first data from the first database element;
providing, by the computer system, the requested first data to the requesting computer system;
performing, by the computer system, a refactoring operation for the first database element, wherein the refactoring operation includes:
storing a portion of data in the first database element identified as unstructured data in the non-relational database; and
including, in the relational database, a reference to a location of the portion of data in the non-relational database; and
storing, by the computer system, refactoring information indicating that the first database element has been refactored.

2. The method of claim 1, wherein the reference to the location of the portion of data in the non-relational database is included by updating the first database element.

3. The method of claim 1, wherein the reference to the location of the portion of data in the non-relational database is included by updating a new database element.

4. The method of claim 1, further comprising:
determining, by the computer system, that a first set of additional data elements within the relational database corresponding to the first data have not been refactored into relational and non-relational portions;
determining, by the computer system, that a second set of additional data elements within the relational database corresponding to the first data have been refactored into relational and non-relational portions; and
in response to the request, performing the refactoring operation for the first set of additional data elements, but not the second set of additional data elements.

5. The method of claim 1, wherein performing the refactoring operation occurs as a background response that has lower priority than handling live data requests.

6. The method of claim 1, wherein performing the refactoring operation overlaps with the providing the requested first data to the requesting computer system.

7. The method of claim 1, wherein the relational database is a source relational database, wherein the requested first data is retrieved from the source relational database, and wherein the refactoring operation further includes storing relational portions of data in the first database element to a target relational database that is different from the source relational database.

8. The method of claim 7, further comprising:
receiving, by the computer system from the requesting computer system, a second request to access second data from the database system;
determining, by the computer system, that a second database element within the database system has been refactored into relational and non-relational portions;
in response to the determining, retrieving by the computer system, a first portion of the second data from the target relational database and a second portion of the second data from the non-relational database;
combining, by the computer system, the retrieved first and second portions of the second data; and
providing, by the computer system, the combined first and second portions to the requesting computer system.

9. The method of claim 7, further comprising, after completing refactoring of data in the database system into the target relational database and the non-relational database:
receiving, by the computer system, a subsequent request to access the first data from the database system;
accessing, by the computer system in response to the subsequent request, a refactor index to determine locations of the first data in the target relational database and the non-relational database;
retrieving by the computer system using the determined locations, a first portion of the first data from the target relational database and a second portion of the first data from the non-relational database;
combining, by the computer system, the retrieved first and second portions of the first data; and
providing, by the computer system, the combined first and second portions to the requesting computer system.

10. The method of claim 1, further comprising accessing a configuration file to determine which portions of data stored in the database system comprise unstructured data.

11. A non-transitory, computer-readable medium having program instructions stored thereon that are capable of causing a computer system to implement operations comprising:
receiving, from a requesting computer system, a request to access first data from a database system, wherein the request conforms to a relational database application programming interface (API), wherein the database system includes a relational database storing structured data and unstructured data that is being refactored according to a refactoring process such that the unstructured data is stored in a non-relational database;
determining that a first database element within the relational database that includes the first data has not yet been refactored;
retrieving the requested first data from the first database element;
providing the requested first data to the requesting computer system;
performing a refactoring operation for the first database element, wherein the refactoring operation includes:
storing a portion of data in the first database element identified as unstructured data in the non-relational database; and
including, in the relational database, a reference to a location of the portion of data in the non-relational database; and
storing refactoring information indicating that the first database element has been refactored.

12. The computer-readable medium of claim 11, wherein the reference to the location of the portion of data in the non-relational database is included by updating the first database element.

13. The computer-readable medium of claim 11, wherein the reference to the location of the portion of data in the non-relational database is included by updating a new database element.

14. The computer readable medium of claim 11, wherein the instructions are further capable of causing the computer system to implement operations comprising:
- determining that a first set of additional data elements within the relational database corresponding to the first data have not been refactored into relational and non-relational portions;
- determining that a second set of additional data elements within the relational database corresponding to the first data have been refactored into relational and non-relational portions; and
- in response to the request, performing the refactoring operation for the first set of additional data elements, but not the second set of additional data elements.

15. The computer-readable medium of claim 11, wherein the instructions are further capable of causing the computer system to perform the refactoring operation as a background response that has lower priority than handling live data requests.

16. A system comprising:
- a database system that includes a source relational database, a target relational database, and a non-relational database, wherein the source relational database stores structured data and unstructured data that is being refactored according to a refactoring process such that the unstructured data is stored in the non-relational database;
- a database interface computer system comprising a processor subsystem and memory storing program instructions executable to:
  - receive, from a requesting computer system via a relational database application programming interface (API), a request to access first data from the database system;
  - determine that a first database element within the source relational database that includes the first data has not yet been refactored;
  - retrieve the requested first data from the first database element;
  - provide the requested first data to the requesting computer system;
  - perform, in response to a refactoring trigger, a refactoring operation for the first database element that includes:
    - storing a first portion of data in the first database element identified as unstructured data to the non-relational database; and
    - storing a second portion of data in the first database element that is not identified as unstructured data to the target relational database; and
    - storing refactoring information indicating that the first database element has been refactored.

17. The system of claim 16, wherein the refactoring operation further includes storing, in the target relational database, a reference to a location of the first portion of data in the non-relational database.

18. The system of claim 16, wherein the program instructions are further executable to:
- determine that a first set of additional data elements within the source relational database corresponding to the first data have not been refactored into relational and non-relational portions;
- determine that a second set of additional data elements within the source relational database corresponding to the first data have been refactored into relational and non-relational portions; and
- in response to the request, performing the refactoring operation for the first set of additional data elements, but not the second set of additional data elements.

19. The system of claim 16, wherein the instructions are further executable to cause the database interface computer system to perform the refactoring operation as a background response that has lower priority than handling live data requests.

20. The system of claim 16, wherein performing the refactoring operation overlaps with the providing the requested first data to the requesting computer system.

* * * * *